United States Patent
Ackeret et al.

(10) Patent No.: US 9,156,409 B2
(45) Date of Patent: Oct. 13, 2015

(54) DEVICE FOR HANGING ITEMS OF CLOTHING

(75) Inventors: Peter Ackeret, Zuerich (CH); Juergen Siegfried Skott, Altensteig (DE); Soeren Groth, Herrenberg (DE)

(73) Assignee: Kinetix AG (CH)

( * ) Notice: Subject to any disclaimer, the term of this patent is extended or adjusted under 35 U.S.C. 154(b) by 156 days.

(21) Appl. No.: 13/508,741

(22) PCT Filed: Nov. 11, 2010

(86) PCT No.: PCT/EP2010/006857
§ 371 (c)(1),
(2), (4) Date: Jul. 30, 2012

(87) PCT Pub. No.: WO2011/057779
PCT Pub. Date: May 19, 2011

(65) Prior Publication Data
US 2012/0286008 A1    Nov. 15, 2012

(30) Foreign Application Priority Data

Nov. 13, 2009 (DE) .......................... 10 2009 052 824
Apr. 29, 2010 (DE) .......................... 10 2010 018 788

(51) Int. Cl.
   *B60R 7/10*     (2006.01)
   *B60R 7/04*     (2006.01)

(52) U.S. Cl.
CPC .. *B60R 7/10* (2013.01); *B60R 7/043* (2013.01)

(58) Field of Classification Search
CPC .......... A47G 25/32; A47G 25/08; B60R 7/10; B60R 7/04; B60R 7/08; B60N 2/48
USPC ............... 224/275, 313, 553, 482; 223/94
See application file for complete search history.

(56) References Cited

U.S. PATENT DOCUMENTS

| | | | |
|---|---|---|---|
| 3,131,817 A | 5/1964 | Schenkler | |
| 3,927,741 A | 12/1975 | Rubinstein | |
| 5,383,588 A * | 1/1995 | Kazel | ............ 224/275 |
| 6,076,716 A | 6/2000 | Reyes | |

FOREIGN PATENT DOCUMENTS

| | | | | |
|---|---|---|---|---|
| DE | 199 13 745 | | 10/2000 | |
| DE | 19913745 A1 * | | 10/2000 | ........ B60T 7/10 |
| DE | 203 09 356 | | 9/2003 | |
| WO | WO 9108928 A1 * | | 6/1991 | ........ B60R 7/10 |
| WO | WO 9325411 A1 * | | 12/1993 | ........ B60R 7/10 |
| WO | WO 2008/131944 | | 11/2008 | |

* cited by examiner

*Primary Examiner* — Brian D Nash
*Assistant Examiner* — Corey Skurdal
(74) *Attorney, Agent, or Firm* — Paul Vincent

(57) ABSTRACT

A device for hanging items of clothing on a vehicle seat part, such as a backrest (1a), a head restraint 1(d) or head restraint holder (1c) of a vehicle seat (1) has a fastening hook (4e, 40e) for hanging the clothes hanger (4a, 4b, 4c, 40a, 40b, 40c, 40b', 40c'), the fastening hook being movable between an inoperative position, in which the fastening hook (4e, 40e) is entirely or partially accommodated in the clothes hanger (4a, 4b, 4c, 40a, 40b, 40c, 40b', 40c') or bears against the latter, and an operative position, in which the fastening hook (4e, 40e) protrudes out of the clothes hanger (4a, 4b, 4c, 40a, 40b, 40c, 40b', 40c') to such an extent that the clothes hanger (4a, 4b, 4c, 40a, 40b, 40c, 40b', 40c') can be hung on a wardrobe bar.

13 Claims, 5 Drawing Sheets

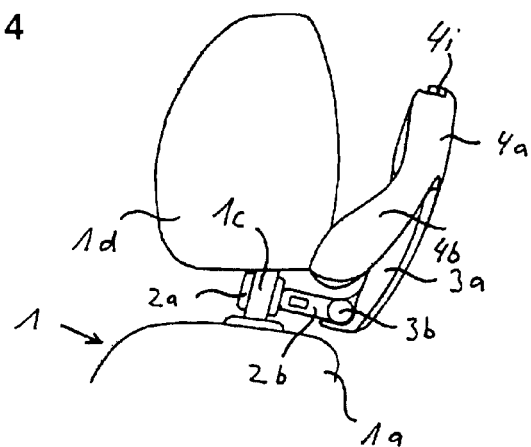
Fig. 4
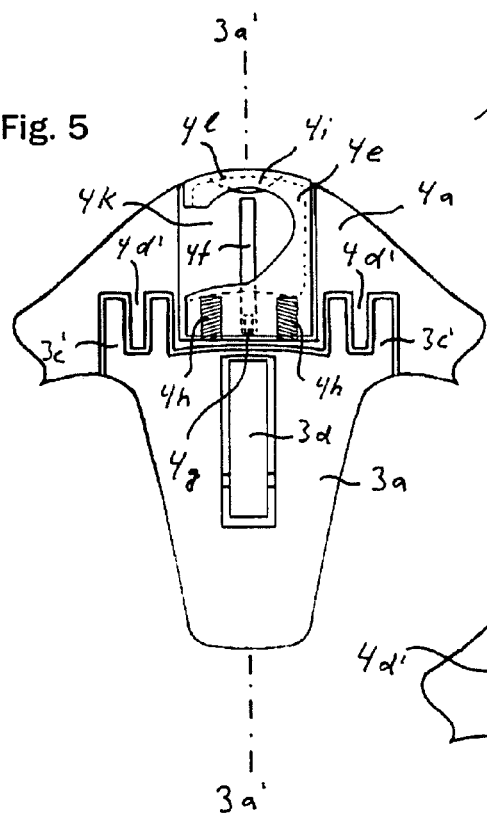
Fig. 5
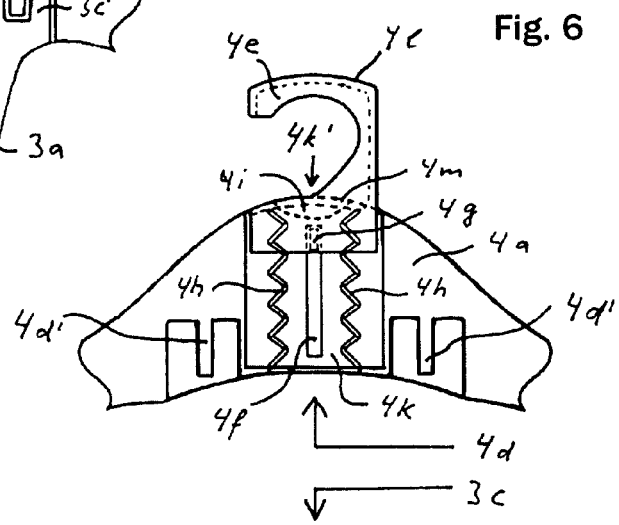
Fig. 6
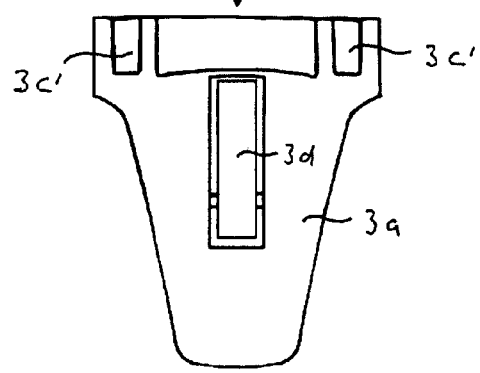

DEVICE FOR HANGING ITEMS OF CLOTHING

This application is the national stage of PCT/EP2010/006857 filed on Nov. 11, 2010 and claims Paris Convention Priority of DE 10 2009 052 824.5 filed Nov. 13, 2009 and DE 10 2010 018 788.7 filed Apr. 29, 2010.

BACKGROUND OF THE INVENTION

The invention relates to a device for hanging items of clothing on a vehicle seat part, such as a backrest, a head restraint or head restraint holder of a vehicle seat.

Devices for hanging items of clothing in vehicles, usually in the form of clothes hangers that are attached to the head restraint bars on the rear sides of vehicle seats by various fastening means are known in various designs.

The clothes hanger is usually provided with one or more supporting elements that are attached to the head restraint bars with a clamping device. Clothes hangers, supporting elements and fastening device usually form a fixed assembly, e.g. consisting of an appropriately shaped spring steel wire with adapter elements made of plastic at the ends of the wires which are clamped between the head restraint bars by spring force.

There is often a need not only to hang up items of clothing on a clothes hanger to look after them during the journey but, for example, during hotel stays, to remove the items of clothing from the vehicle on the clothes hanger and to hang them in a different place on a wardrobe bar.

For this purpose, it is necessary for the clothes hanger to be provided with a fastening hook, which, however, is a safety risk for passengers on the back seat of the vehicle and is also unsatisfactory in terms of aesthetics.

The object of the invention is to create a device for hanging items of clothing on a clothes hanger that can be attached to the rear side of vehicle seats and that enables items of clothing to be taken out of the vehicle on the clothes hanger and hung on a wardrobe bar.

SUMMARY OF THE INVENTION

This object is inventively achieved with a device for hanging items of clothing on a vehicle seat part, such as a backrest, head restraint, or head restraint holder of a vehicle seat having the characteristics of the independent claim.

The device comprises a fastening means for connecting the device to the vehicle seat part, a support element which is connected to the fastening means and a clothes hanger which is connected to the support element via a releasable coupling, wherein a fastening hook for hanging the clothes hanger is provided on the clothes hanger, the fastening hook being movable between an inoperative position, in which the fastening hook is entirely or partially accommodated in the clothes hanger or bears against the latter, and an operative position, in which the fastening hook protrudes out of the clothes hanger to an extent such that the clothes hanger can be hung on a wardrobe bar.

Interposing a releasable coupling between the support element and the clothes hanger enables the clothes hanger to be quickly and simply separated from the device and used separately. The fastening hook is accommodated entirely or partially in the clothes hanger for use in the vehicle or bears against the latter and is therefore not a hindrance to either safety or aesthetics. If the clothes hanger is required outside the vehicle, e.g. for a hotel stay, it can be separated from the support element with or without the jacket and transported by the pull-out or fold-out fastening hook and hung on a wardrobe bar.

The coupling between the support element and the clothes hanger is preferably constituted as a plug connection with a first coupling element on the support element and a second coupling element on the clothes hanger so that the clothes hanger can be separated with one hand from the support element just by pulling the clothes hanger or the fastening hook.

In a preferred embodiment, a latch is provided that can be released with an actuating member, wherein the actuating member should preferably be located in a position on the clothes hanger that remains accessible even when an item of clothing is hanging thereon, e.g. next to the fastening hook or on the side of the clothes hanger facing toward the vehicle seat. Finally, it is also possible for the latch to be released by pulling out or folding out the fastening hook.

The clothes hanger is preferably constituted as a hollow body with a centrally positioned hanger body and hanger arms disposed on the sides thereof that are closed by covers on their underside. On the underside of the clothes hanger, the second coupling element is preferably located that closes the hanger body.

In a preferred embodiment, an upwardly open receiving space is provided on the hanger body in which the fastening hook is accommodated when in the inoperative position. In the receiving space, a preferably vertically disposed guide rail can be provided in which a guide slide disposed at the lower end of the fastening hook is guided so that the fastening hook can be pulled through the opening vertically upward out of the clothes hanger, until the guide slide stops at the end of the guide rail. At the side of the opening, a grip recess can be provided on the clothes hanger for gripping the fastening hook.

Horizontally oriented covers can be mounted on the fastening hook that close the opening of the receiving space in the operative and/or inoperative position of the fastening hook.

In place of the receiving space on the hanger body, a pit-like recess can be disposed on one of its wide sides in which the fastening hook is accommodated when in the inoperative position.

Instead of a linear guide, the fastening hook could also be connected to the hanger body via a joint with a pivot axis that extends parallel or transverse to the wide side of the hanger body.

The fastening hook can be preloaded in the inoperative position by a spring so that it automatically moves back into the inoperative position when not in use.

In a preferred embodiment, the support element is constituted as a longitudinal support whose longitudinal axis extends essentially vertically and which is fixed or movably connected to the fastening means at its lower end, preferably via a joint.

The support element is preferably connected to a fastening means via a releasable coupling. The coupling can comprise a receiving socket and a plug element and a manually releasable latching device.

The clothes hanger is preferably disposed at the upper end of the column-like support element and the coupling between the support element and the clothes hanger is preferably provided at the upper face end of the support element so that no offset arises between the support element and clothes hanger. The coupling elements on the support element are preferably not protruding so that passengers are not endangered when the clothes hanger is removed.

On the wide side of the support element or of the hanger body facing away from the head restraint of the vehicle seat, a preferably fold-out clothes hook can be disposed which is accommodated in a recess when in the inoperative position and is preloaded in the inoperative position by a spring. The longitudinal axis of the clothes hook extends preferably parallel to the longitudinal axis of the support element.

In a preferred embodiment, the clothes hook is disposed on the hanger body and is provided at its upper end with a bend oriented toward the hanger body which is flush with the contour of the hanger body when the clothes hanger is folded in. The recess is preferably extended sufficiently far beyond the bent end of the clothes hook that it can comfortably be gripped to fold out the clothes hanger.

Further preferred embodiments of the invention result from the remaining characteristics stated in the dependent claims.

It is understood that the characteristics stated above and below can be used not only in the stated combination but also in other combinations or alone without departing from the scope of this invention.

BRIEF DESCRIPTION OF THE DRAWING

FIG. 3 shows a perspective view of the support element according to FIG. 1 without the clothes hanger and with the clothes hook folded in.

FIG. 4 shows a side view of the device according to FIG. 1, with fastening means, mounted on the head restraint holder of a vehicle seat, with the clothes hook folded in.

FIG. 5 shows a detail of the device according to FIG. 1 in a longitudinal section FIG. 6 shows a detail of the device according to FIGS. 2 and 3 in a longitudinal section

DESCRIPTION OF THE PREFERRED EMBODIMENT

FIGS. 1 to 6 show a first variant of the inventive device. The support element $3a$ is movably connected at its lower end to the plug element $2b$ via the joint $3b$. The receiving socket $2a$, into which the plug element $2b$ is plugged and releasably latched with the latch device $2c$ (FIG. 4), is fastened to the head restraint holder $1c$, which connects the backrest $1a$ with the head restraint $1d$ of a vehicle seat 1. Receiving socket $2a$, plug element $2b$ and latching device $2c$ together form a releasable coupling with which the support element $3a$, $3b$ can be fastened to the clothes hanger $4a$, $4b$, $4c$ on the vehicle seat 1 or can removed therefrom.

The fold-out clothes hook $3d$ is disposed on the wide side of the support element $3a$, $3b$ facing away from the vehicle seat and is accommodated in the recess $3d''$ disposed in the support element $2a$, $3b$ when in the inoperative position.

Two sleeves $3c'$ are constituted on the end face at the upper end of the support element $3a$, $3b$ and form the first coupling element $3c$ into which two pins $4d'$ formed on the underside of the clothes hanger $4a$, $4b$, $4c$ engage to form the second coupling element $4d$.

The clothes hanger comprises a centrally disposed hanger body $4a$ and hanger arms $4b$, $4c$ disposed on the sides thereof.

The receiving space $4k$ is centrally accommodated in the hanger body $4a$, and is provided with an opening $4k'$ on the upper side that is flush with the outer contour of the hanger body $4a$.

The fastening hook $4a$ is accommodated in the receiving space $4k$ when in its inoperative position and is guided with a vertically disposed linear guide $4f$, $4g$. The linear guide comprises a guide rail $4f$ disposed in the receiving space and a guide slide $4g$ mounted at the lower end of the fastening hook $4e$ which slides in the guide rail and forms the stop for limiting the pull-out path of the fastening hook $4e$.

The fastening hook $4e$ is preloaded into the inoperative position by the springs $4h$.

A lower cover $4m$ and an upper cover $4l$ are provided on the fastening hook $4e$ and close the opening $4k'$ of the receiving space $4k$ in the operative position (FIG. 1) or inoperative position (FIG. 2) of the fastening hook.

A grip recess $4i$ is constituted on the wide side of the opening $4k'$ in which the fastening hook $4e$ is held at the edge of the upper cover $4l$ and can be pulled out of the receiving space $4k$. When pulling ceases, the fastening hook $4e$ is pulled into the receiving space $4k$ by the springs $4h$.

Figure 1:
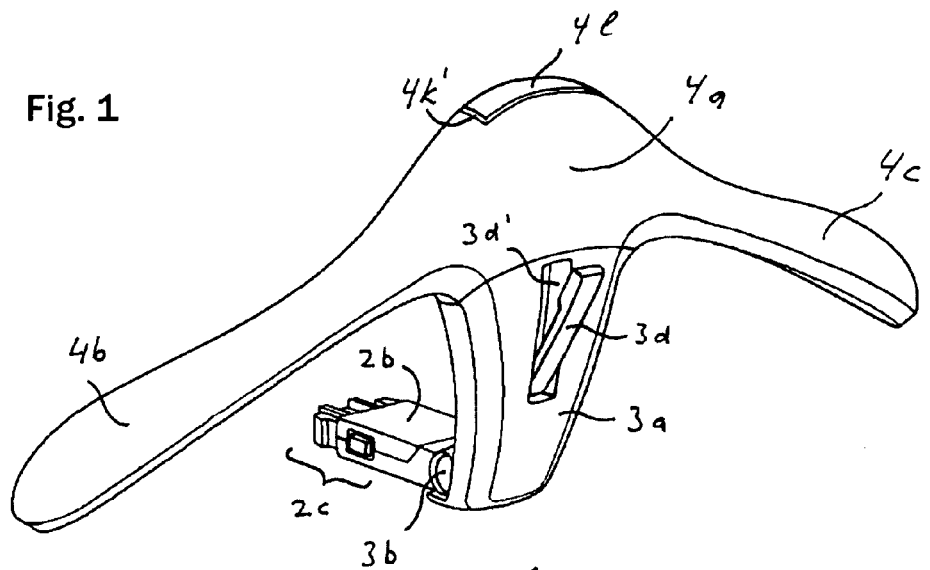
FIG. 1 shows a perspective view of a first variant of the inventive device with a clothes hanger and the fastening hook in the inoperative position and the folded-out clothes hook and parts of the fastening means.
Figure 2:
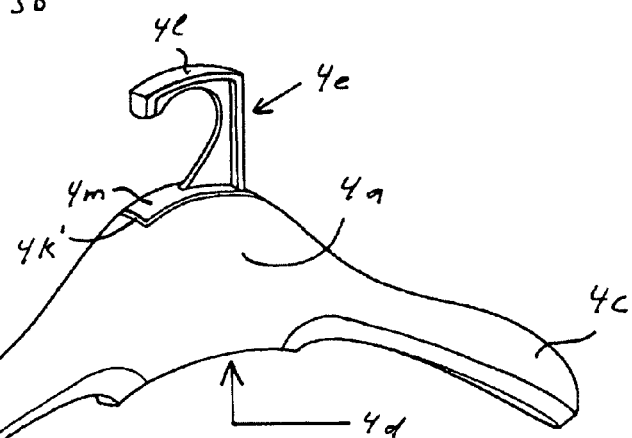
FIG. 2 shows a perspective view of the clothes hanger removed from the support element according to FIG. 1 with the fastening hook in the operative position
Figure 3:
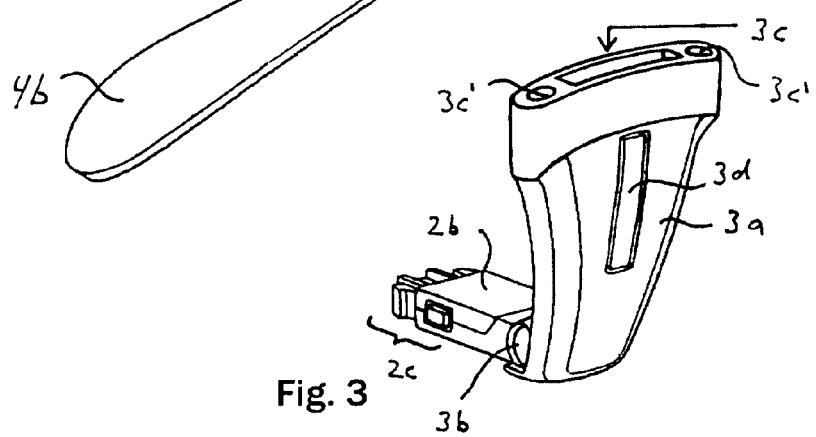
Figure 7:
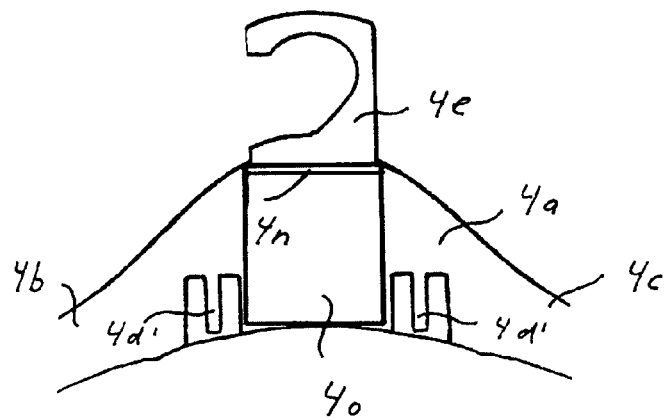
FIG. 7 shows a longitudinal section of a variant of the fastening hook in the operative position
Figure 8:
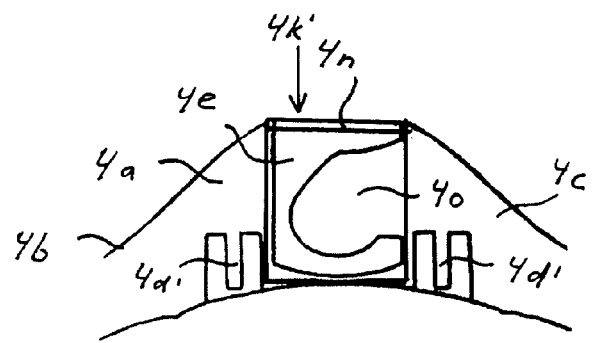
FIG. 8 shows a longitudinal section of the fastening hook according to FIG. 7 in the inoperative position

FIGS. 7 and 8 show a variant of the fastening hook $4e$ that is connected to the hanger body via a pivot axis $4n$ extending approximately horizontally and parallel with the wide side of the hanger body. A pit-like recess $4o$ is constituted on the wide side of the hanger body $4a$ in which the fastening hook $4e$ is accommodated when in its inoperative position.

Figure 9:
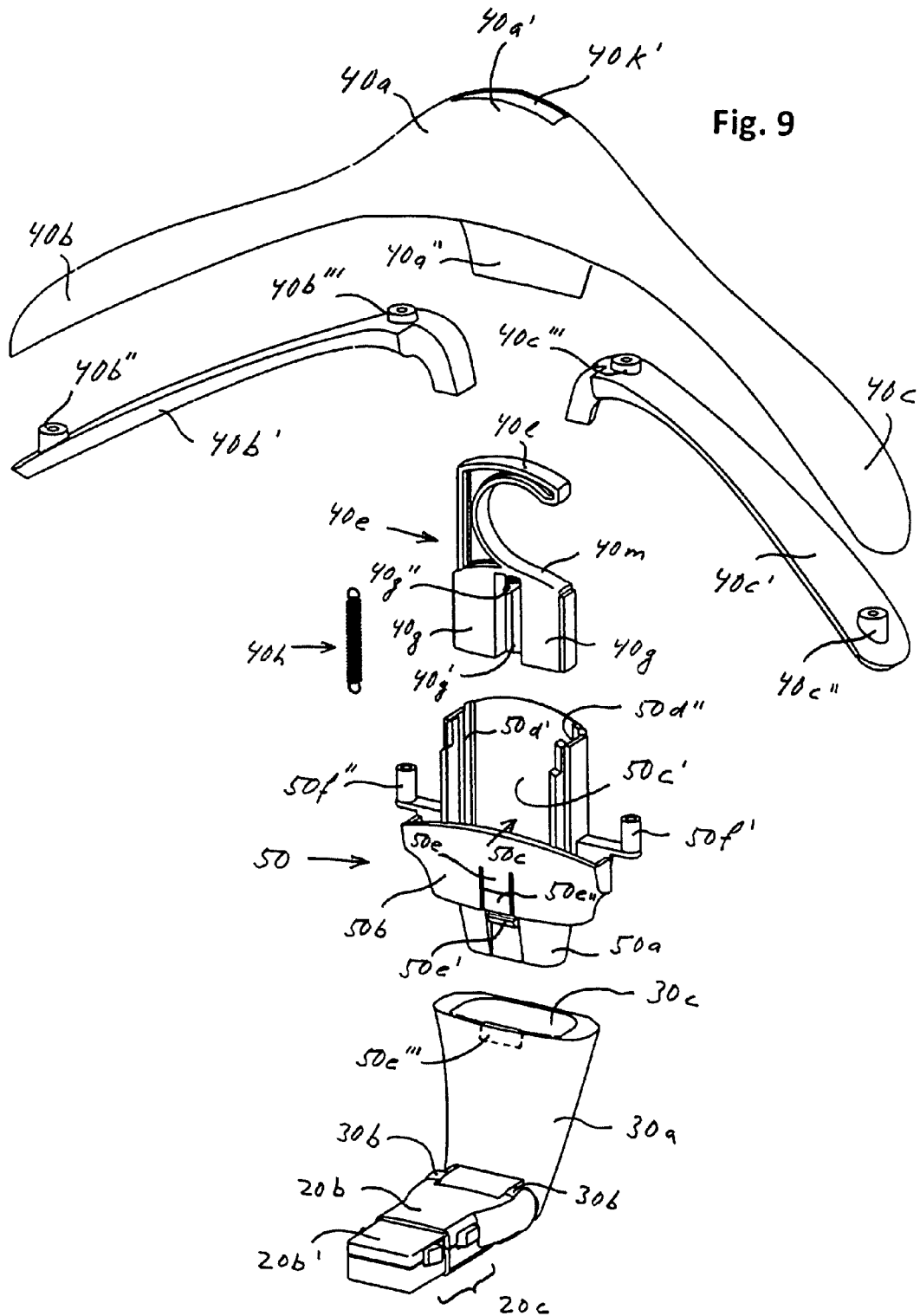
FIG. 9 shows a perspective exploded view of a second variant of the inventive device

FIG. 9 shows an exploded view of a second variant of the inventive device. The clothes hanger $40a$, $40b$, $40c$ is constituted as a hollow body and is open on its underside. The open undersides of the hanger body $40a$ are covered by the intermediate element $50$ that is introduced into the hanger body $40a$ from below and is screwed onto the clothes hanger $40a$, $40b$, $40c$ with the two covers $40b'$, $40c'$ on the screw hole protrusions $40b''$, $40b'''$, $40c''$, $40c'''$, $50f'$, $50f''$.

The second coupling element $50a$ has the form of a rounded pyramid frustum and is disposed on the underside of the intermediate element $50$, the coupling element being accommodated in a complementary bearing shell disposed at the upper end of the support element $3a$, $30a$ which constitutes the first coupling element $30c$.

A latching device $50e$, $50e'$, $50e''$, $50e'''$, with which the first and second coupling element $30c$, $50a$ are held together, is disposed on the side of the intermediate element $50$ facing toward the vehicle seat part $1a$, $1c$, $1d$.

A spring tab $50e$ is constituted on the rear cover $50b$ of the intermediate element $50$ and has a lower end on which a latching hook $50e'$ is disposed. The latching hook $50e'$ latches into the trap $50e'''$ disposed on the inside of the first coupling element $30c$ once the coupling elements $30c$, $50a$ have been plugged together. The latching device $50e$, $50e'$, $50''$, $50e'''$ is released by pressing on the actuating member $50e''$ so that the clothes hanger $40a$, $40b$, $40c$, $40b'$, $40c'$, $50$ can be separated from the support element $30a$.

A receiving space $50c$ for the fastening hook $40e$ is provided on the intermediate element $50$. Guide rails $50d'$, $50d''$, in which the guide slide $40g$ of the fastening hook $40e$ is guided, are disposed on the side walls of the receiving space $50c$ connected via the back wall $50c'$. A recess $50g'$ in the center of the guide slide 40g is provided with a spring attachment 40g" for receiving the spring 40h that pulls the fastening hook 40e into the receiving space 50c when not in use.

At the upper end face 40a' of the hanger body 40a has an opening 40k' through which the fastening hook 40e can be moved out of the receiving space 50c into the operative position. The upper and lower covers 401, 40m on the fastening hook 40e close the opening 40k' in the inoperative or operative position of the fastening hook 40e.

A blind cover 40a" is mounted on the hanger body 40a on the side facing away from the vehicle seat part 1a, 1c, 1d and covers parts of the intermediate element 50.

The support element 30a is connected to the plug element 20b, 20b' at the lower end via the joint 30b. The guide section 20b' of the plug element 20b is plugged into a receiving socket 2a on vehicle seat part 1a, 1c, 1d and is releasably latched to the latching device 20c.

Figure 10:
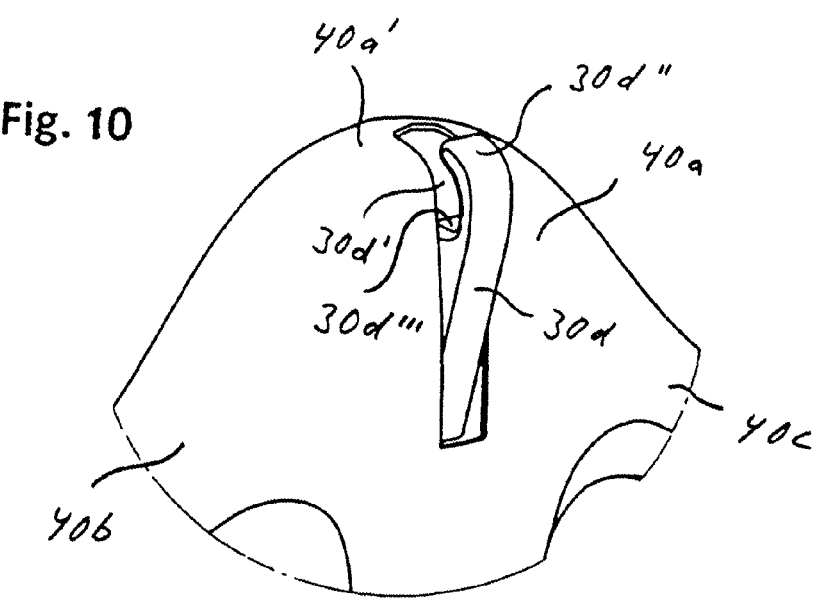
FIG. 10 shows a further variant of the fastening hook in the operative position

FIG. 10 shows a clothes hanger 30d disposed on the side of the hanger body 40s facing away from the vehicle seat part 1a, 1b, 1d, whose longitudinal axis extends parallel with the longitudinal axis 30a' (FIG. 5) of the support element 30a and that is rotatably held at its lower end on the hanger body 40a.

The upper end of the clothes hanger 30d has a bend oriented toward the clothes hanger 40a whose outside is flush with the upper end face 40a' of the hanger body 40a when the clothes hook 30d is folded into the recess 30d'. The recess 30d' extends sufficiently far beyond the bend 30d" that the free end of the clothes hook 30d can be gripped to fold it out.

A support 30d''' is disposed behind the bend 30d" on the inside of the clothes hook 30d and prevents hanging loops of items of clothing from becoming caught in the bearing region of the clothes hook 30d.

The clothes hook 30d is preloaded into the folded-in position with a leg spring (not depicted) disposed in the pivot region.

We claim:

1. A device for hanging items of clothing on a vehicle seat part, such as a backrest, a head restraint or head restraint holder of the vehicle seat, the device comprising:
    a fastening means for connecting the device to the vehicle seat part;
    a support element constituted as a longitudinal support having a longitudinal axis extending in a substantially vertical direction and having an upper end and a lower end, wherein said lower end is connected to said fastening means;
    a clothes hanger having a centrally disposed hanger body and hanger arms disposed on sides thereof, said clothes hanger also having a fastening hook for hanging said clothes hanger, said fastening hook being movable between an inoperative position in which said fastening hook is entirely or partially accommodated in or bears against said clothes hanger and an operative position in which said fastening hook protrudes out of said clothes hanger to an extent such that said clothes hanger can be hung on a wardrobe bar;
    a first coupling element disposed on said upper end of said support element facing toward said hanger body; and
    a second coupling element disposed on an underside of said hanger body facing toward said upper end of said support element, wherein said first and second coupling elements are structured as a plug connection and cooperate with each other to form a releasable coupling for connecting said clothes hanger to said support element.

2. The device of claim 1, wherein said support element is connected at its lower end to the fastening means via a joint.

3. The device of claim 1, wherein said fastening means comprises a releasable coupling device with a receiving socket, a plug element and a latching device with which said plug element is latched in said receiving socket.

4. The device of claim 1, wherein said fastening hook is preloaded in an inoperative position by means of a spring.

5. The device of claim 1, further comprising a latching device with which said first coupling element and said second coupling element can be latched.

6. The device of claim 5, further comprising an actuating member for releasing said latching device, said actuating member being disposed on a side of said support element or of said hanger body facing the vehicle seat.

7. The device of claim 1, wherein undersides of said hanger body and said hanger arms are at least partially closed with covers.

8. The device of claim 7, wherein said hanger body has a receiving space or a pit-like recess to accommodate said fastening hook in an inoperative position thereof.

9. The device of claim 8, wherein said receiving space has an opening disposed on an upper end surface of said hanger body through which said fastening hook can be moved between an inoperative position and an operative position.

10. The device of claim 7, wherein said fastening hook is guided in or on said hanger body via a vertically oriented linear guide.

11. The device of claim 7, wherein said fastening hook is connected to said hanger body via a pivot axis.

12. The device of claim 11, wherein said pivot axis extends approximately horizontally and parallel or transversely with respect to a wide side of said hanger body.

13. The device of claim 7, wherein a fold-out clothes hook is disposed on a wide side of said support element or said hanger body facing away from the vehicle seat part, said clothes hook being received in an inoperative position in a recess constituted on said support element or on said hanger body.

\* \* \* \* \*